US009494101B2

(12) United States Patent
Anzawa

(10) Patent No.: US 9,494,101 B2
(45) Date of Patent: Nov. 15, 2016

(54) CONTROL SYSTEM FOR INTERNAL COMBUSTION ENGINE AND CONTROLLING METHOD FOR INTERNAL COMBUSTION ENGINE

(71) Applicant: Toyota Jidosha Kabushiki Kaisha, Toyota-shi Aichi-ken (JP)

(72) Inventor: Takumi Anzawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 256 days.

(21) Appl. No.: 14/531,099

(22) Filed: Nov. 3, 2014

(65) Prior Publication Data

US 2015/0144116 A1 May 28, 2015

(30) Foreign Application Priority Data

Nov. 22, 2013 (JP) .................. 2013-241653

(51) Int. Cl.
| | | |
|---|---|---|
| *F02M 69/04* | (2006.01) | |
| *F02D 41/22* | (2006.01) | |
| *F02D 41/30* | (2006.01) | |
| *F02D 41/00* | (2006.01) | |

(52) U.S. Cl.
CPC ....... *F02D 41/3094* (2013.01); *F02D 41/0047* (2013.01); *F02D 41/221* (2013.01); *F02M 69/046* (2013.01); *F02M 2200/06* (2013.01); *Y02T 10/47* (2013.01)

(58) Field of Classification Search
CPC ............. F02D 41/3094; F02D 41/221; F02D 41/0047; F02D 41/222; F02D 41/224; F02D 19/025; F02D 19/0623; F02D 33/003; F02M 21/0293; F02M 69/046; F02M 69/045; F02M 2200/05; F02M 2200/06
USPC .......... 123/431, 479, 568.11, 568.16, 198 D, 123/435, 436; 73/114.45, 114.47, 119 A
See application file for complete search history.

(56) References Cited

U.S. PATENT DOCUMENTS

| | | | | |
|---|---|---|---|---|
| 5,535,621 | A * | 7/1996 | Glidewell | F02D 41/221 |
| | | | | 123/478 |
| 7,370,521 | B1 * | 5/2008 | Sandmann | F02D 41/221 |
| | | | | 73/114.45 |
| 2006/0090732 | A1 | 5/2006 | Shibagaki | |
| 2006/0207564 | A1 * | 9/2006 | Kinose | F02D 41/221 |
| | | | | 123/431 |
| 2008/0183363 | A1 | 7/2008 | Yagihashi | |
| 2008/0288160 | A1 * | 11/2008 | Murakami | F02D 41/221 |
| | | | | 701/104 |
| 2009/0090332 | A1 | 4/2009 | Brehob | |
| 2010/0043746 | A1 * | 2/2010 | Hartmann | F02D 19/0692 |
| | | | | 123/299 |

(Continued)

FOREIGN PATENT DOCUMENTS

| | | |
|---|---|---|
| JP | H01-216066 A | 8/1989 |
| JP | 2005-201113 A | 7/2005 |

(Continued)

*Primary Examiner* — Lindsay Low
*Assistant Examiner* — George Jin
(74) *Attorney, Agent, or Firm* — Dinsmore & Shohl LLP

(57) ABSTRACT

A control system executes failure detection of a direct injector when a port injector stops injection and the direct injector injects, and executes the failure detection when a recirculation passage is closed by an EGR valve.

12 Claims, 7 Drawing Sheets

(56) References Cited

U.S. PATENT DOCUMENTS

| | | | |
|---|---|---|---|
| 2012/0116651 A1* | 5/2012 | Miyamoto | F02D 41/30 |
| | | | 701/103 |
| 2012/0247422 A1* | 10/2012 | Nagakura | F02D 41/1454 |
| | | | 123/299 |
| 2015/0159578 A1* | 6/2015 | Surnilla | F02D 41/3076 |
| | | | 701/104 |

FOREIGN PATENT DOCUMENTS

| | | |
|---|---|---|
| JP | 2005-240565 A | 9/2005 |
| JP | 2006-132336 A | 5/2006 |
| JP | 2008-121566 A | 5/2008 |
| JP | 2010-174818 A | 8/2010 |
| JP | 2011-099401 A | 5/2011 |
| JP | 2011-504680 | 12/2011 |
| JP | 2013-036441 A | 2/2013 |

\* cited by examiner

CONTROL SYSTEM FOR INTERNAL COMBUSTION ENGINE AND CONTROLLING METHOD FOR INTERNAL COMBUSTION ENGINE

INCORPORATION BY REFERENCE

The disclosure of Japanese Patent Application No. 2013-241653 filed on Nov. 22, 2013 including the specification, drawings and abstract is incorporated herein by reference in its entirety.

BACKGROUND OF THE INVENTION

1. Field of the Invention

The present invention relates to a control system for an internal combustion engine and a controlling method for an internal combustion engine and in particular to a technique of detecting failure of a direct injector in an internal combustion engine that is provided with the direct injector and a port injector.

2. Description of Related Art

An internal combustion engine has been known that is provided with: a direct injector for directly injecting fuel into a combustion chamber; and a port injector for injecting the fuel into an intake passage. Japanese Patent Application Publication No. 2011-099401 (JP 2011-099401 A) discloses that, in such an internal combustion engine, a fuel injection amount and an air-fuel ratio are learned during execution of fuel injection only by the direct injector, and the fuel injection only by the direct injector continues until the learning is completed. In addition, Japanese Patent Application Publication No. 2013-036441 (JP 2013-036441 A) discloses an internal combustion engine that includes an exhaust gas recirculation (EGR) system that can introduce exhaust gas into an intake passage.

SUMMARY OF THE INVENTION

In the internal combustion engine that is provided with the direct injector and the port injector, failure detection of the director injector can be executed during the execution of the fuel injection only by the direct injector as in a case where the above learning is executed. At this time, fuel injection by the port injector is stopped. Thus, when the EGR system introduces the exhaust gas into the intake passage, the heat of the exhaust gas possibly increases a temperature at a tip of the port injector. Accordingly, deposits are likely to be accumulated at the tip of the port injector.

The present invention suppresses accumulation of deposits on a port injector in an internal combustion engine that is provided with a direct injector and the port injector, the accumulation of the deposits being caused during failure detection of a direct injector.

According to a first aspect of this invention, an internal combustion engine includes a direct injector, a port injector, a recirculation passage, and a valve. The direct injector directly injects fuel into a combustion chamber of the internal combustion engine. The port injector injects the fuel into an intake passage. The recirculation passage recirculates exhaust gas that flows through an exhaust passage to the intake passage. The valve is provided in the recirculation passage, and opens or closes the recirculation passage. A control system for the internal combustion engine executes failure detection of the direct injector in a state that the direct injector injects the fuel when the fuel injection by the port injector is stopped and the recirculation passage is closed by the valve.

Since the failure detection is executed when the recirculation passage is closed by the valve, the recirculation of the exhaust gas can be suppressed in the state that the fuel injection by the port injector is stopped. Accordingly, a temperature increase at a tip of the port injector by the heat of the exhaust gas is suppressed. Thus, according to the control system for this internal combustion engine, accumulation of deposits on the port injector, which is caused during the failure detection of the direct injector, can be suppressed in the internal combustion engine that is provided with the direct injector and the port injector.

The control system may execute the failure detection when an execution condition of the failure detection is met while the recirculation passage is closed by the valve.

According to this configuration, the failure detection is executed only when the recirculation of the exhaust gas is stopped. Therefore, it is possible to suppress the recirculation of the exhaust gas from being restricted due to the failure detection.

The control system may control the valve to close the recirculation passage and execute the failure detection, when the exhaust gas is recirculated while the execution condition of the failure detection is met.

According to this configuration, the failure detection is executed in preference to the recirculation of the exhaust gas. Thus, the failure detection can be executed at appropriate timing.

The control system may determine that the recirculation passage is closed when a coolant temperature of the internal combustion engine is lower than a predetermined temperature.

When the coolant temperature in the internal combustion engine is high, combustion is stabilized even with the recirculated exhaust gas. On the contrary, when the coolant temperature in the internal combustion engine is low, the recirculation of the exhaust gas destabilizes the combustion, and the recirculation of the exhaust gas is thus closed. Accordingly, it is possible to determine whether the recirculation is closed on the basis of the coolant temperature in the internal combustion engine. Thus, it is possible to reliably determine that the recirculation is closed.

The control system may determine that the recirculation passage is closed when the valve is closed.

It is determined that the recirculation is closed when the valve is closed. Thus, it is possible to further reliably determine that the recirculation is closed.

The control system may determine an operation state of the internal combustion engine based on a speed of the internal combustion engine and an amount of the air that flows into the combustion chamber, and may determine that the execution condition is met when the internal combustion engine is operated in a predetermined operation range (in a range where the operation state of the internal combustion engine is stable).

When the direct injector is failed, the operation state of the internal combustion engine becomes unstable. Accordingly, if the failure detection is executed when the internal combustion engine is operated in the above range, erroneous detection of failure of the direct injector can be suppressed.

According to a second aspect of this invention, an internal combustion engine includes a direct injector, a port injector, a recirculation passage, and a valve. The direct injector directly injects fuel into a combustion chamber of the internal combustion engine. The port injector injects the fuel into an intake passage. The recirculation passage recirculates exhaust gas that flows through an exhaust passage to the intake passage. The valve is provided in the recirculation passage, and opens or closes the recirculation passage. A controlling method for the internal combustion engine includes the steps of: controlling the direct injector and the port injector; and executing failure detection of the direct injector in a state that the direct injector injects the fuel when the fuel injection by the port injector is stopped and the recirculation passage is closed by the valve.

Since the failure detection is executed when the recirculation passage is closed by the valve, the recirculation of the exhaust gas can be suppressed in the state that the fuel injection by the port injector is stopped. Accordingly, a temperature increase at a tip of the port injector by the heat of the exhaust gas is suppressed. Thus, according to the controlling method for this internal combustion engine, accumulation of deposits on the port injector, which is caused during the failure detection of the direct injector, can be suppressed in the internal combustion engine that is provided with the direct injector and the port injector.

The step of executing the failure detection may further include a step of executing the failure detection when an execution condition of the failure detection is met while the recirculation passage is closed by the valve.

According to this configuration, the failure detection is executed only when the recirculation of the exhaust gas is stopped. Therefore, it is possible to suppress the recirculation of the exhaust gas from being restricted due to the failure detection.

The step of executing the failure detection may further include a step of controlling the valve to close the recirculation passage and executing the failure detection, when the exhaust gas is recirculated while the execution condition of the failure detection is met.

According to this configuration, the failure detection is executed in preference to the recirculation of the exhaust gas. Thus, the failure detection can be executed at appropriate timing.

According to the aspect of this invention, accumulation of deposits on the port injector, which is caused during the failure detection of the direct injector, can be suppressed in the internal combustion engine that is provided with the direct injector and the port injector.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
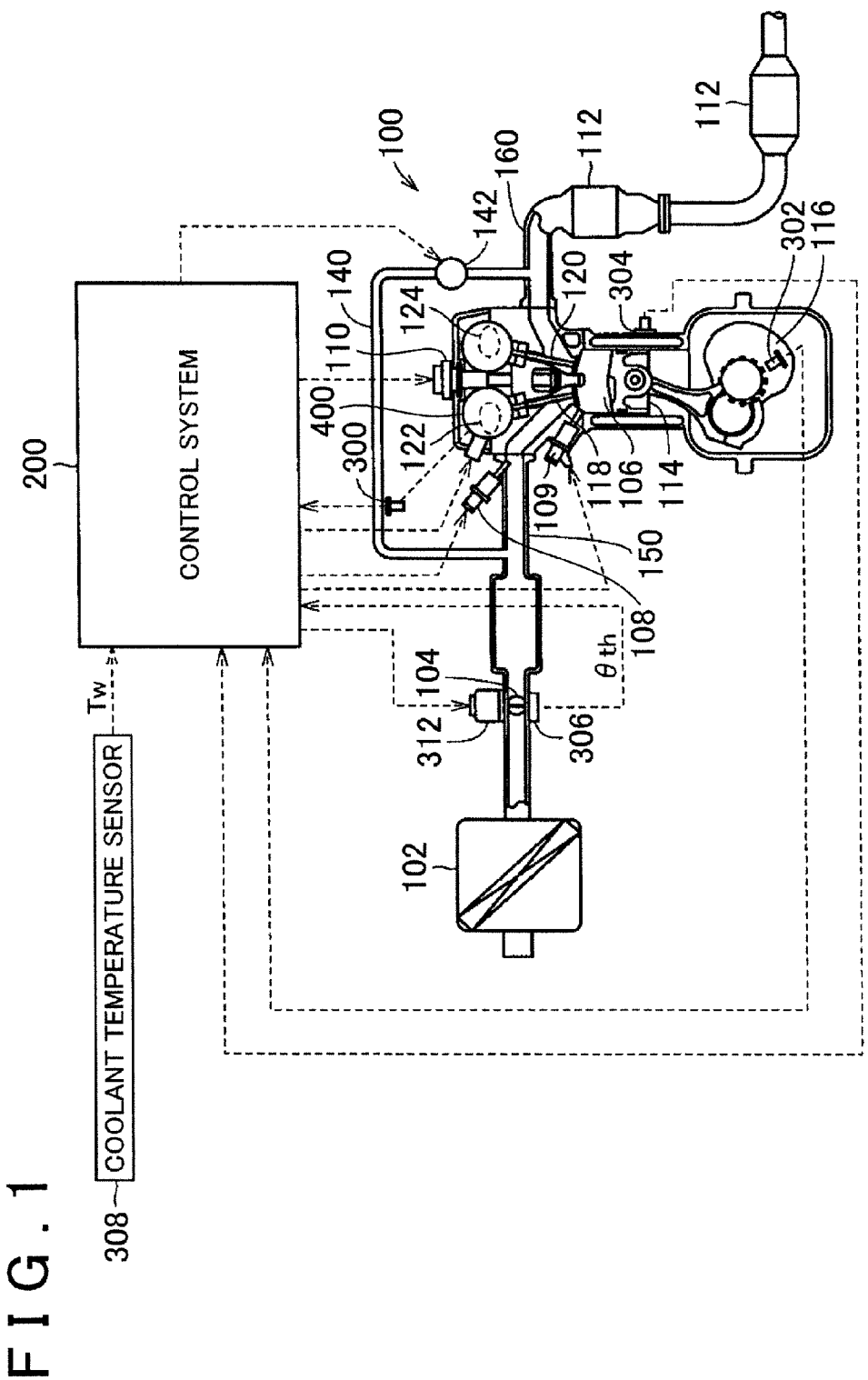
FIG. 1 is a block diagram of an overall configuration of an engine according to a first embodiment of this invention.

A detailed description will hereinafter be made on embodiments of the present invention with reference to drawings. A description will hereinafter be made on plural embodiments, and it has been intended since the filing of the subject application that configurations described in the embodiments are appropriately combined. It should be noted that the same or corresponding components in the drawings are denoted by the same reference numerals, and the description thereof will not be repeated.

First Embodiment

FIG. 1 is a block diagram of an overall configuration of an engine according to a first embodiment of this invention. Referring to FIG. 1, air flows from an air cleaner 102 to an engine 100. An intake air amount is adjusted by a throttle valve 104. The throttle valve 104 is driven by a throttle motor 312. The intake air is delivered to a cylinder 106 (a combustion chamber) through an intake passage 150.

Fuel is directly injected into the cylinder 106 from a direct injector 109. In other words, an injection opening of the direct injector 109 is provided in the cylinder 106. In addition to the direct injector 109, the engine 100 is provided with a port injector 108 for injecting the fuel into the intake passage 150 (an intake port). The port injector 108 is provided in the intake passage 150.

A ratio of a fuel injection amount from the direct injector 109 to a total injection amount as a sum of the fuel injection amount from the direct injector 109 and a fuel injection amount from the port injector 108 (hereinafter also described as a DI ratio r) is determined in accordance with a load and speed of the engine 100. Also, as will be described below in detail, when failure detection of the direct injector 109 is executed, it is set that the DI ratio r=100%. In this case, the fuel is only injected from the direct injector 109, and the fuel injection by the port injector 108 is stopped.

On the other hand, when the engine 100 is operated in a range of 0%<the DI ratio r<100%, the fuel is injected from both of the direct injector 109 and the port injector 108. The DI ratio r univocally corresponds to a sharing ratio between the fuel injection amount from the direct injector 109 and the fuel injection amount from the port injector 108.

Air-fuel mixture in the cylinder 106 is ignited by an ignition plug 110 and combusted. The air-fuel mixture after combustion, that is, exhaust gas is purified by a three-way catalyst 112 that is provided in an exhaust passage 160, and then is discharged to the outside of a vehicle. A piston 114 is pushed down by the combustion of the air-fuel mixture, thereby causing a crankshaft 116 to rotate.

Some of the exhaust gas is recirculated from the exhaust passage 160 to the intake passage 150 through an EGR passage 140. The EGR passage 140 is a pipeline provided between the exhaust passage 160 and the intake passage 150. An EGR valve 142 is provided in the EGR passage 140. Opening and closing of the EGR valve 142 is controlled by a control system 200. When the EGR valve 142 is opened, the EGR passage 140 communicates between the exhaust passage and the intake passage. When the EGR valve 142 is closed, the EGR passage 140 is closed. Throttle losses can be reduced, and pumping losses can also be reduced by opening the EGR valve 142 to recirculate the exhaust gas to the intake passage. Thus, fuel economy can be improved.

An intake valve 118 and an exhaust valve 120 are provided on a top of the cylinder 106. An amount and timing of the air that is introduced into the cylinder 106 are controlled by the intake valve 118. An amount and timing of the exhaust gas that is discharged from the cylinder 106 are controlled by the exhaust valve 120. The intake valve 118 is driven by a cam 122, and the exhaust valve 120 is driven by a cam 124.

A lift amount and a working angle of the intake valve 118 may be controlled by a variable valve lift (VVL) system 400. A lift amount and a working angle of the exhaust valve 120 may also be controllable. The engine 100 may be configured by not including the VVL system 400, or may be configured by further including a variable valve timing (VVT) system that controls opening and closing timing of the valve.

The control system 200 is configured by including an electronic control unit (ECU) that contains a central processing unit (CPU), a memory, input/output buffers, and the like (none of which is shown). The control system 200 controls a throttle opening degree θth, ignition timing, fuel injection timing, the fuel injection amount, an actuation state (opening/closing timing, the lift amount, the working angle, and the like) of the intake valve, and an EGR amount (an opening/closing state of the EGR valve 142), so that the engine 100 is in a desired operation state. The control system 200 receives a signal from each of a cam angle sensor 300, a crank angle sensor 302, a knock sensor 304, a throttle opening degree sensor 306, and a coolant temperature sensor 308.

The cam angle sensor 300 outputs a signal indicative of a cam position. The crank angle sensor 302 outputs a signal indicative of a rotational speed of the crankshaft 116 (the engine speed) and a rotational angle of the crankshaft 116. The knock sensor 304 outputs a signal indicative of vibration intensity of the engine 100. The throttle opening degree sensor 306 outputs a signal indicative of the throttle opening degree θth. The coolant temperature sensor 308 outputs a signal indicative of a coolant temperature Tw of the engine 100.

The control system 200 executes failure detection control of the direct injector 109 with the DI ratio r of 100%. More specifically, the control system 200 executes accidental fire detection of the engine 100 with the DI ratio r of 100%, and determines the failure of the direct injector 109 when the accidental fire of the engine 100 is detected.

As an example, the control system 200 determines that the accidental fire occurs in the engine 100 when a deviation in rotation among the cylinders, that is, a difference between a maximum value and a minimum value of the rotational speed of the crankshaft while the crankshaft rotates only at a crank angle of 720° is at least equal to a predetermined value. However, a method of detecting the accidental fire is not limited to this, and any of various well-known techniques, such as by using ion current that is detected by an electrode arranged in the combustion chamber, may be used.

During the execution of the failure detection control of the direct injector 109, the fuel injection by the port injector 108 is stopped. Thus, if the EGR valve 142 is opened and the exhaust gas is introduced into the intake passage 150, the heat of the exhaust gas tends to increase a temperature at a tip of the port injector 108. This is because a cooling effect resulted from the fuel injection by the port injector 108 cannot be obtained when the fuel injection is stopped. When the temperature at the tip of the port injector 108 is increased just as described, such a problem occurs that deposits are likely to be accumulated at the tip of the port injector due to components of the exhaust gas.

In the first embodiment, the failure detection of the direct injector 109 is executed when the EGR valve 142 closes the EGR passage 140. Accordingly, the recirculation of the exhaust gas can be suppressed while the fuel injection by the port injector 108 is stopped. Since the temperature increase at the tip of the port injector 108 by the heat of the exhaust gas is suppressed, the accumulation of the deposits on the port injector 108 can be suppressed when the failure of the direct injector 109 is detected.

Figure 2:
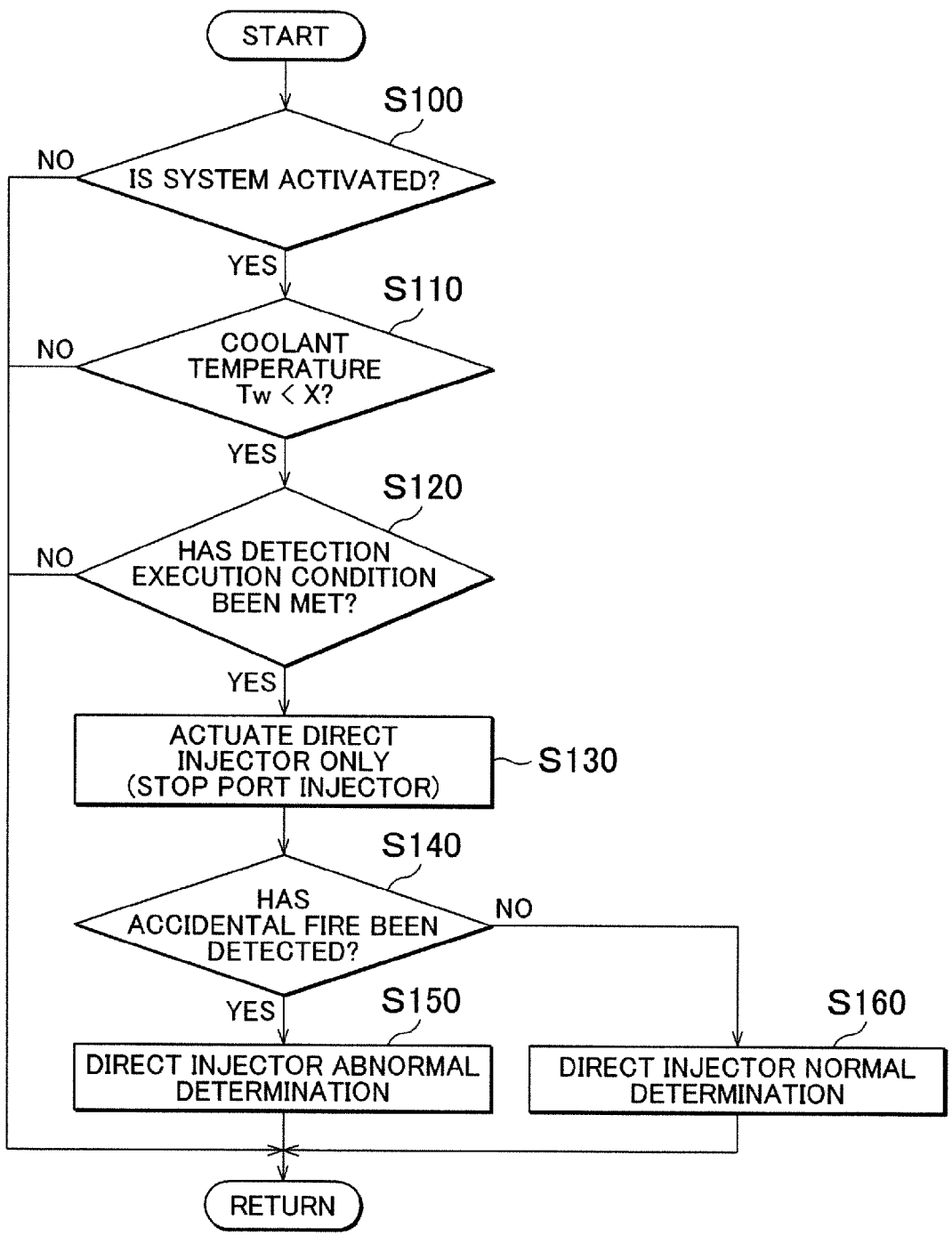
FIG. 2 is a flowchart for illustrating failure detection control of a direct injector that is executed by a control system shown in FIG. 1.

FIG. 2 is a flowchart for illustrating the failure detection control of the direct injector 109 that is executed by the control system 200 shown in FIG. 1. The flowchart shown in FIG. 2 is realized by executing a program that is stored in the control system 200 in advance at predetermined intervals. Alternatively, a process can be performed by building dedicated hardware (an electronic circuit) for some of steps (the same applies to flowcharts shown in FIG. 5 to FIG. 7, which will be described below).

Referring to FIG. 2, the control system 200 determines in step (hereinafter, step is described as S) 100 whether a system for operating the engine 100 is activated. That the system is activated means that the engine 100 is in an operable state, and as an example, means a state that an ignition switch is ON or a state that the engine 100 is being operated. If it is determined that the system is not activated (NO in S 100), the following process steps are skipped, and the process returns to a main routine.

If it is determined that the system is activated (YES in S 100), the control system 200 determines whether the coolant temperature Tw of the engine 100 is lower than a predetermined value X (S110). The predetermined value X is a value that is used to determine whether the exhaust gas is recirculated.

Figure 3:
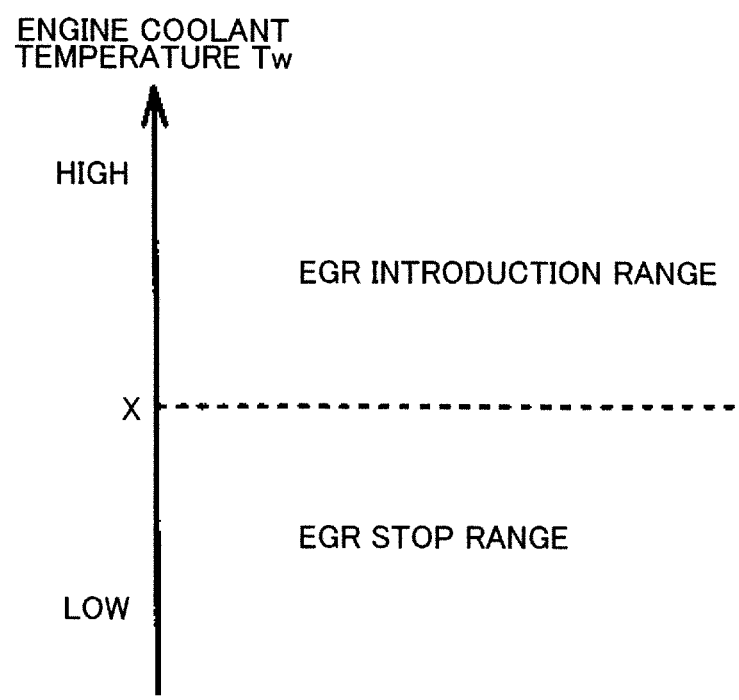
FIG. 3 is a chart of an EGR introduction range with respect to an engine coolant temperature.

FIG. 3 is a chart of an EGR introduction range with respect to the coolant temperature Tw of the engine 100. Referring to FIG. 3, if the coolant temperature Tw of the engine 100 is at least equal to the predetermined value X, the engine 100 is warm enough for the stable combustion even when the exhaust gas is recirculated. Thus, the exhaust gas can be introduced into the intake passage 150 (an EGR introduction range).

On the other hand, if the coolant temperature Tw of the engine 100 is lower than the predetermined value X, the engine 100 is cold. Accordingly, the combustion becomes unstable when the exhaust gas is recirculated. Thus, the recirculation of the exhaust gas is stopped for the stable operation of the engine 100 (an EGR stop range). Just as described, it is possible with the coolant temperature Tw of the engine 100 to determine whether the exhaust gas is recirculated.

Referring back to FIG. 2, if it is determined in 5110 that the coolant temperature Tw of the engine 100 is at least equal to the predetermined value X (NO in S110), it is considered that the exhaust gas is recirculated, and thus the failure detection of the direct injector 109 is not executed. On the other hand, if it is determined that the coolant temperature Tw of the engine 100 is lower than the predetermined value X (YES in S110), it is considered that the recirculation of the exhaust gas is stopped. Then, the control system 200 determines whether a detection execution condition for executing the failure detection of the direct injector 109 has been met (S120).

The detection execution condition is met when the engine 100 is operated in an appropriate state to detect the failure of the direct injector 109. More specifically, the detection execution condition is met when the engine 100 is operated in a range where the operation state of the engine 100 is stable. When the direct injector 109 is failed, the operation state of the engine 100 becomes unstable. Accordingly, if the failure detection is executed in the range where the operation state of the engine 100 is stable while the direct injector 109 is in a normal state, a difference between a failed state and the normal state of the direct injector 109 is further clarified. Thus, erroneous detection can be suppressed.

Figure 4:
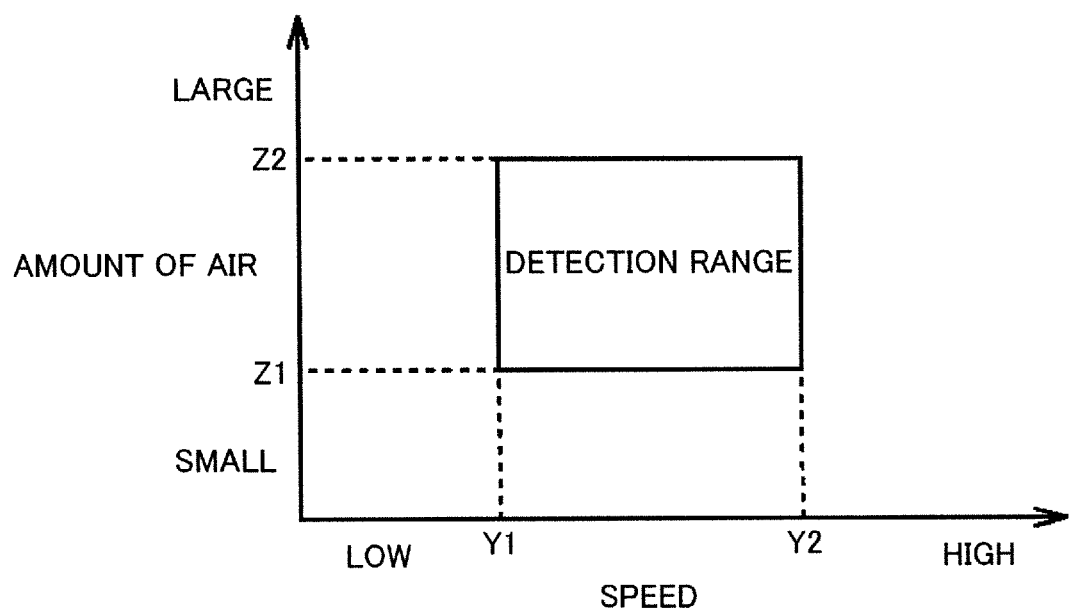
FIG. 4 is a chart of an example of a detection range where failure detection of the direct injector is executed.

FIG. 4 is a chart of an example of the detection range where the failure detection of the direct injector 109 is executed. Referring to FIG. 4, when the speed of the engine 100 is between Y1 and Y2 and an amount of the air suctioned into the engine 100 is between Z1 and Z2, it is considered that the engine 100 is in the range where the operation state thereof is stable. Accordingly, the detection execution condition is met.

In addition to the above, the detection execution condition may be set such that the failure detection is executed in a range where the engine 100 is frequently operated or such that the failure detection is executed at a predetermined execution frequency (for example, executed only once in a period from the activation to the termination of the system of the engine 100, or the like).

Referring back to FIG. 2, if it is determined that the detection execution condition has not been met in S120 (NO in S 120), the following process steps are skipped, and the process returns to the main routine. If it is determined that the detection execution condition has been met in S120 (YES in S 120), the control system 200 actuates the direct injector 109 and stops the port injector 108 (S130). Accordingly, the fuel injection is executed only by the direct injector 109 (the DI ratio r=100%).

Next, in S140, the control system 200 determines whether the accidental fire of the engine 100 has been detected. Since the method of detecting the accidental fire is just as described above, the description thereof will not be made.

If it is determined that the accidental fire of the engine 100 has been detected (YES in S140), it is considered that the direct injector 109 is failed, and the control system 200 thus determines that the direct injector 109 is abnormal (S150). If it is determined that the accidental fire of the engine 100 has not been detected (NO in S140), it is considered that the direct injector 109 is not failed, and the control system 200 thus determines that the direct injector 109 is normal (S160).

As described above, the failure detection is executed under the condition that the recirculation of the exhaust gas is closed by the EGR valve 142 in this first embodiment. Thus, the fuel injection by the port injector 108 is stopped when the introduction of the exhaust gas into the intake passage is stopped. Accordingly, the temperature increase at the tip of the port injector 108 by the heat of the exhaust gas is suppressed. Therefore, according to this first embodiment, the accumulation of the deposits on the port injector 108, which is caused during the failure detection of the direct injector 109, can be suppressed in the engine 100 that is provided with the direct injector 109 and the port injector 108.

In addition, when the failure detection execution condition is met while the recirculation of the exhaust gas is closed, the failure detection of the direct injector 109 is executed. Thus, the recirculation of the exhaust gas can be suppressed from being inhibited due to the failure detection. Therefore, the failure detection of the direct injector 109 can be executed while the fuel economy is improved by the recirculation of the exhaust gas.

Modified Example

A description will be made on a modified example of the first embodiment, in which it is determined whether the exhaust gas is recirculated on the basis of the opening/closing state of the EGR valve 142 instead of the coolant temperature Tw of the engine 100. It should be noted that a configuration of the engine 100 according to the modified example of the first embodiment is the same as that in the first embodiment.

Figure 5:
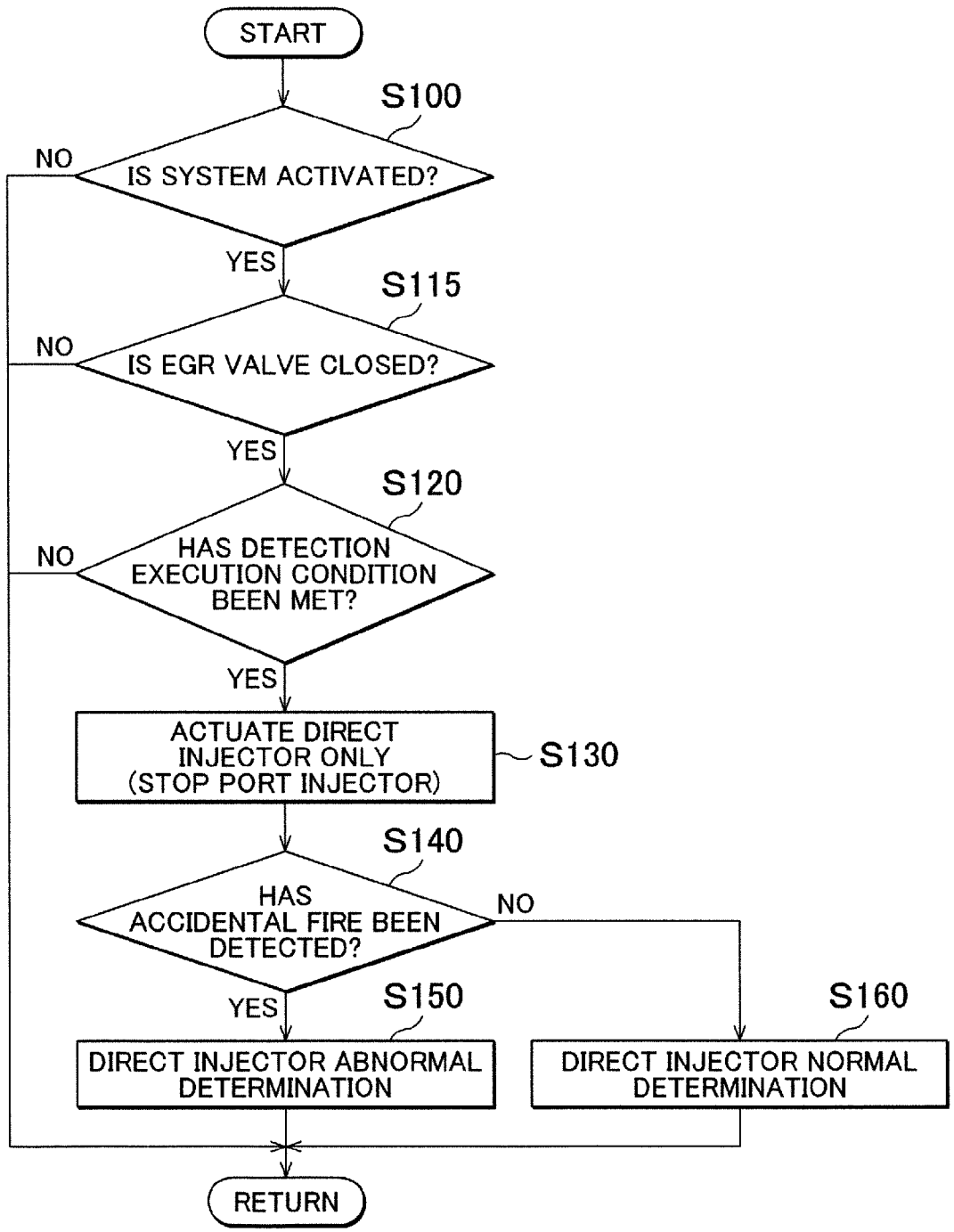
FIG. 5 is a flowchart for illustrating the failure detection control of the direct injector that is executed by a control system according to a modified example of the first embodiment of this invention.

FIG. 5 is a flowchart for illustrating the failure detection control of the direct injector that is executed by a control system 200A according to the modified example of the first embodiment of this invention. Referring to FIG. 5, the description on S100 and S120 to S160 will not be made since they are the same as those in the first embodiment. If it is determined in S100 that the system for operating the engine 100 is activated (YES in S100), the control system 200A determines whether the EGR valve 142 is closed (S 115). Here, the control system 200A may determine that the EGR valve 142 is closed on the basis of output of a sensor for detecting an opening degree of the EGR valve 142, or may determine that the EGR valve 142 is closed on the basis of a control command for controlling the opening degree of the EGR valve 142.

If it is determined that the EGR valve 142 is opened (NO in S115), it is considered that the exhaust gas is recirculated, and thus the failure detection of the direct injector 109 is not executed. On the other hand, if it is determined that the EGR valve 142 is closed (YES in S 115), it is considered that the recirculation of the exhaust gas is stopped. Then, the control system 200A determines whether the detection execution condition for executing the failure detection of the direct injector 109 has been met (S120).

As described above, in the modified example of the first embodiment, it is determined that the recirculation of the exhaust gas is closed when the EGR valve 142 is closed. Thus, it is possible to further reliably determine that the recirculation of the exhaust gas is closed.

Second Embodiment

The description has been made on the first embodiment, in which the failure detection of the direct injector 109 is executed when the recirculation of the exhaust gas is stopped. A description will be made on a second embodiment, in which the failure detection of the direct injector 109 is executed by controlling the EGR valve 142, so as to close the recirculation of the exhaust gas when the exhaust gas is recirculated.

Figure 6:
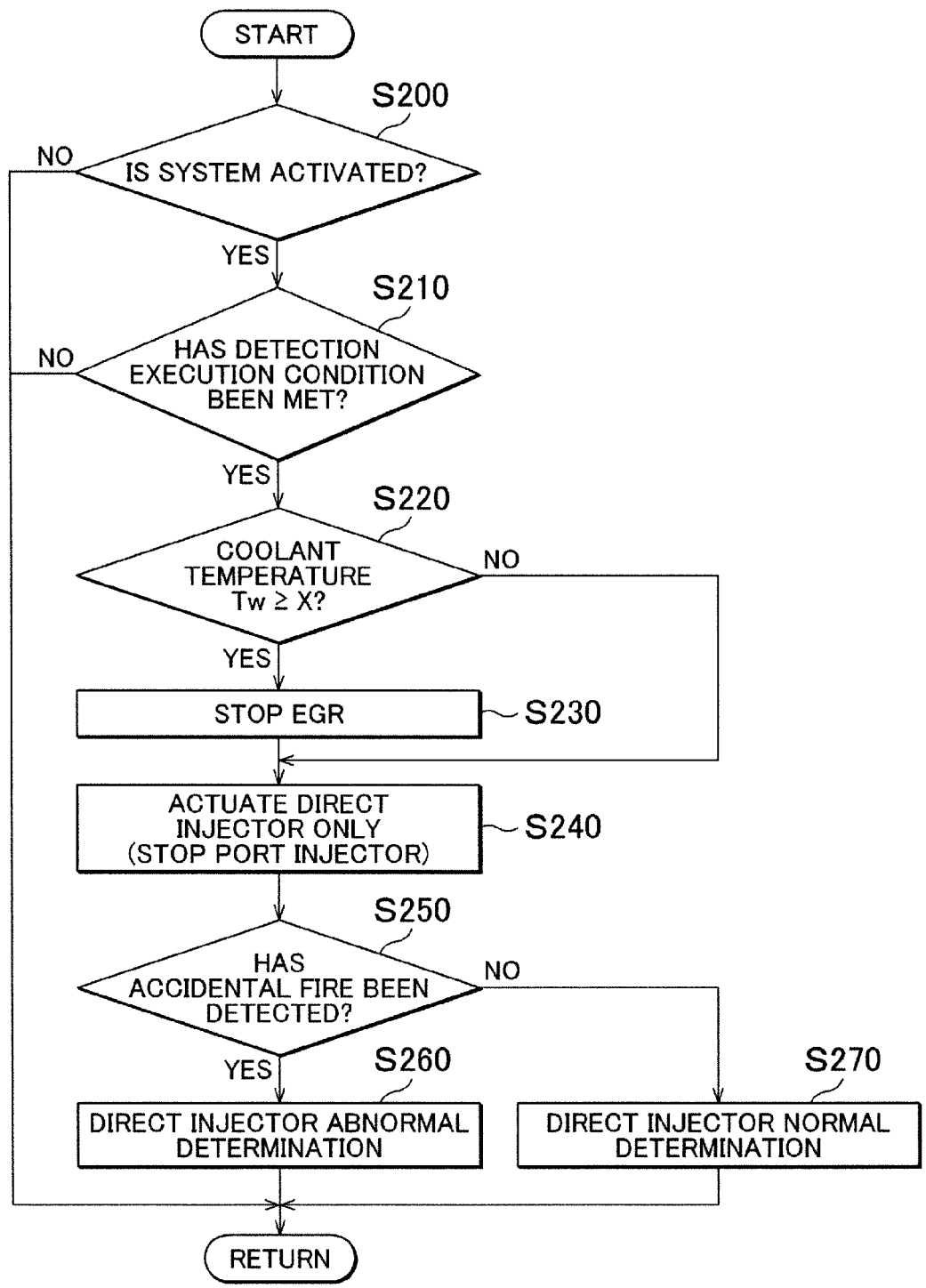
FIG. 6 is a flowchart for illustrating the failure detection control of the direct injector that is executed by a control system according to a second embodiment of this invention.

FIG. 6 is a flowchart for illustrating the failure detection control of the direct injector 109 that is executed by a control system 200B according to the second embodiment of this invention. Referring to FIG. 6, the control system 200B determines in S200 whether the system for operating the engine 100 is activated. If it is determined that the system is not activated (NO in S200), the following process steps are skipped, and the process returns to the main routine.

If it is determined that the system is activated (YES in S200), the control system 200B determines whether the detection execution condition for executing the failure detection of the direct injector 109 has been met (S210). If it is determined that the detection execution condition has not been met (NO in S210), the following process steps are skipped, and the process returns to the main routine. If it is determined that the detection execution condition has been met (YES in S210), the control system 200B determines whether the coolant temperature Tw of the engine 100 is at least equal to the predetermined value X (S220).

If it is determined that the coolant temperature Tw of the engine 100 is at least equal to the predetermined value X (YES in S220), it is considered that the exhaust gas is recirculated, and the control system 200B controls the EGR valve 142 to be closed (S230). Accordingly, the EGR is stopped. On the other hand, if it is determined that the coolant temperature Tw of the engine 100 is lower than the predetermined value X (NO in S220), the execution of 5230 is skipped, and the process proceeds to S240.

Next, in S240, the control system 200B actuates the direct injector 109 and stops the port injector 108 (S240). Accordingly, the fuel injection is executed only by the direct injector 109 (the DI ratio r=100%).

Next, in S250, the control system 200B determines whether the accidental fire of the engine 100 has been detected. Since the method of detecting the accidental fire is as described above, the description thereof will not be made.

If it is determined that the accidental fire of the engine 100 has been detected (YES in S250), it is considered that the direct injector 109 is failed, and the control system 200B thus determines that the direct injector 109 is abnormal (S260). If it is determined that the accidental fire of the engine 100 has not been detected (NO in S250), it is considered that the direct injector 109 is not failed, and the control system 200B thus determines that the direct injector 109 is normal (S270).

As described above, in this second embodiment, if the exhaust gas is recirculated when the failure detection execution condition is met, the EGR valve 142 is controlled to close the recirculation of the exhaust gas, and the failure detection is thereby executed. Accordingly, the failure detection of the direct injector 109 can be executed in preference to the recirculation of the exhaust gas.

Modified Example

A description will be made on a modified example of the second embodiment, in which it is determined whether the exhaust gas is recirculated on the basis of the opening/closing state of the EGR valve 142 instead of the coolant temperature Tw of the engine 100. It should be noted that a configuration of the engine 100 according to the modified example of the second embodiment is the same as that in the first embodiment.

Figure 7:
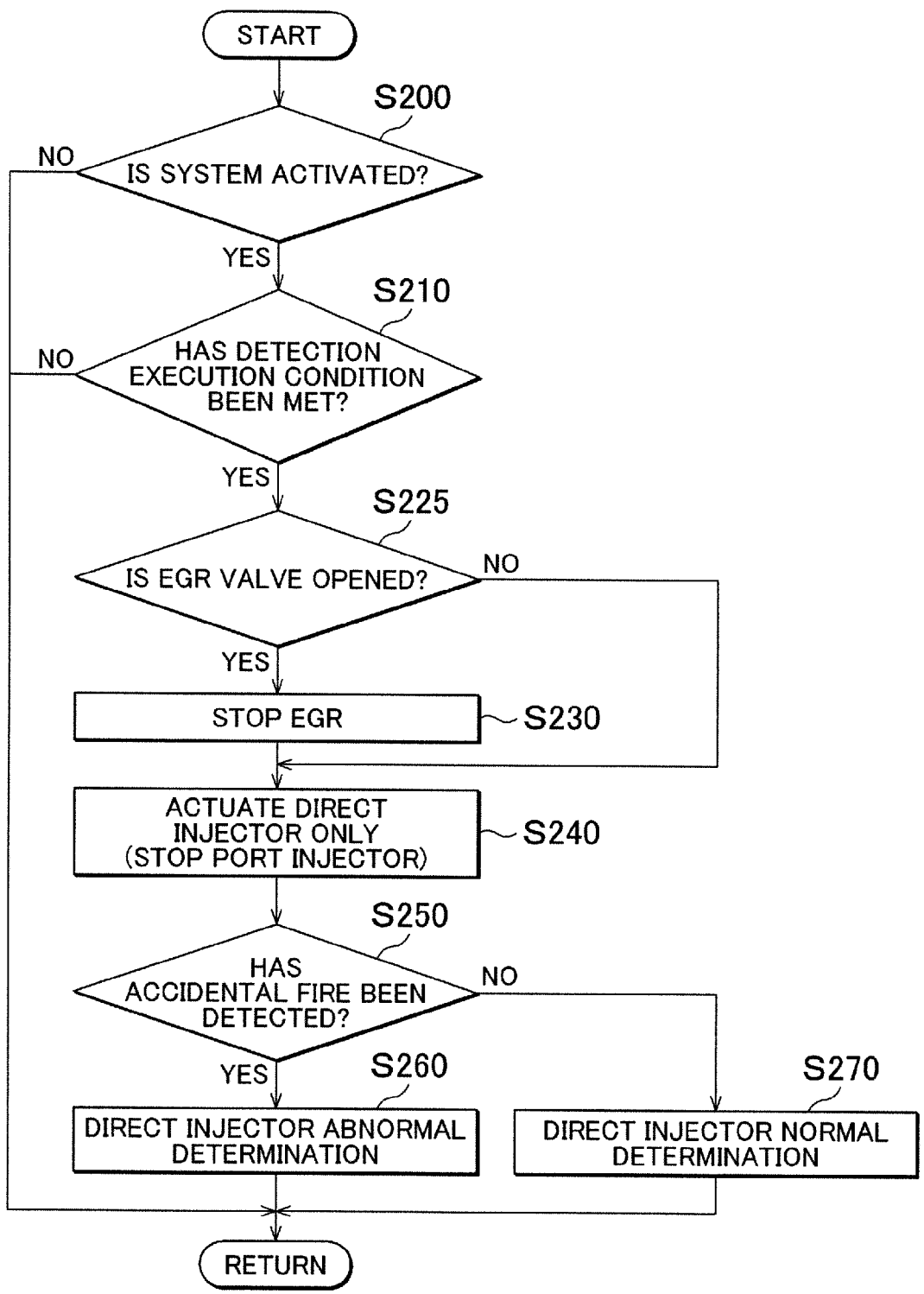
FIG. 7 is a flowchart for illustrating the failure detection control of the direct injector that is executed by a control system according to a modified example of the second embodiment of this invention.

FIG. 7 is a flowchart for illustrating the failure detection control of the direct injector 109 that is executed by a control system 200C according to the modified example of the second embodiment of this invention. Referring to FIG. 7, the description on S200 to S210 and S230 to S270 will not be made since they are the same as those in the second embodiment. If it is determined in 5210 that the detection execution condition has been met (YES in S210), the control system 200C determines whether the EGR valve 142 is opened (S225). Here, the control system 200C may determine that the EGR valve 142 is opened on the basis of output of the sensor for detecting the opening degree of the EGR valve 142, or may determine that the EGR valve 142 is opened on the basis of the control command for controlling the opening degree of the EGR valve 142.

If it is determined that the EGR valve 142 is opened (YES in S225), it is considered that the exhaust gas is recirculated, and the control system 200C controls the EGR valve 142 to be closed (S230). Accordingly, the EGR is stopped. On the other hand, if it is determined that the EGR valve 142 is closed (NO in S225), it is considered that the recirculation of the exhaust gas is stopped. The execution of S230 is skipped, and the process proceeds to S240.

As described above, in the modified example of the second embodiment, the recirculation of the exhaust gas is stopped when the EGR valve 142 is opened. Thus, it is possible to reliably suppress the accumulation of the deposits on the port injector 108 when the failure of the direct injector 109 is detected.

In the above description, the engine 100 corresponds to an example of the "internal combustion engine" of this invention, and the EGR passage 140 corresponds to an example of the "recirculation passage" of this invention. In addition, the EGR valve 142 corresponds to an example of the "valve" of this invention.

It should be understood that the embodiments disclosed herein are given as mere illustration in all respects, but not given to impose any limitation. The scope of the present invention is defined by the scope of the claims rather than by the above description, and intends to include all modifications falling within the scope of the claims and equivalents thereof.

What is claimed is:

1. A control system for an internal combustion engine, the internal combustion engine including: a direct injector that directly injects fuel into a combustion chamber of the internal combustion engine; a port injector that injects the fuel into an intake passage; a recirculation passage that recirculates exhaust gas flowing through an exhaust passage to the intake passage; and a valve provided in the recirculation passage, the valve being configured to open and close the recirculation passage, the control system comprising:
   an electronic control unit configured to execute failure detection of the direct injector in a state that the direct injector injects the fuel when fuel injection by the port injector is stopped and the recirculation passage is closed by the valve.

2. The control system according to claim 1, wherein the electronic control unit executes the failure detection when an execution condition of the failure detection is met while the recirculation passage is closed by the valve.

3. The control system according to claim 2, wherein the electronic control unit determines that the recirculation passage is closed when a coolant temperature of the internal combustion engine is lower than a predetermined temperature.

4. The control system according to claim 2, wherein the electronic control unit determines that the recirculation passage is closed when the valve is closed.

5. The control system according to claim 2, wherein the electronic control unit determines an operation state of the internal combustion engine based on a speed of the internal combustion engine and an amount of air that flows into the combustion chamber, and the electronic control unit determines that the execution condition is met when the internal combustion engine is operated in a predetermined operation range.

6. The control system according to claim 1, wherein the electronic control unit controls the valve to close the recirculation passage and executes the failure detection, when the exhaust gas is recirculated while an execution condition of the failure detection is met.

7. The control system according to claim 6, wherein the electronic control unit determines that the recirculation passage is closed when a coolant temperature of the internal combustion engine is lower than a predetermined temperature.

8. The control system according to claim 6, wherein the electronic control unit determines that the recirculation passage is closed when the valve is closed.

9. The control system according to claim 6, wherein the electronic control unit determines an operation state of the internal combustion engine based on a speed of the internal combustion engine and an amount of air that flows into the combustion chamber, and the electronic control unit determines that the execution condition is met when the internal combustion engine is operated in a predetermined operation range.

10. A controlling method for an internal combustion engine, the internal combustion engine including: a direct injector that directly injects fuel into a combustion chamber of the internal combustion engine; a port injector that injects the fuel into an intake passage; a recirculation passage that recirculates exhaust gas flowing through an exhaust passage to the intake passage; and a valve provided in the recirculation passage, the valve being configured to open and close the recirculation passage, the controlling method comprising:

controlling the direct injector and the port injector; and executing failure detection of the direct injector in a state that the direct injector injects the fuel when fuel injection by the port injector is stopped and the recirculation passage is closed by the valve.

11. The controlling method according to claim 10 further comprising:

executing the failure detection when an execution condition of the failure detection is met while the recirculation passage is closed by the valve.

12. The controlling method according to claim 10 further comprising:

controlling the valve to close the recirculation passage and executing the failure detection, when the exhaust gas is recirculated while an execution condition of the failure detection is met.

\* \* \* \* \*

UNITED STATES PATENT AND TRADEMARK OFFICE
CERTIFICATE OF CORRECTION

| | |
|---|---|
| PATENT NO. | : 9,494,101 B2 |
| APPLICATION NO. | : 14/531099 |
| DATED | : November 15, 2016 |
| INVENTOR(S) | : Takumi Anzawa |

It is certified that error appears in the above-identified patent and that said Letters Patent is hereby corrected as shown below:

In the Specification

In Column 6, Line 59, after "if it is determined in", delete "5110", and insert --S110--, therefor.
In Column 8, Line 61, before "whether the system for operating", delete "5200", and insert --S200--, therefor.
In Column 9, Line 16, after "(NO in S220), the execution of", delete "5230", and insert --S230--, therefor.
In Column 9, Line 59, after "if it is determined in", delete "5210", and insert --S210--, therefor.

Signed and Sealed this
Twenty-fourth Day of January, 2017

Michelle K. Lee
*Director of the United States Patent and Trademark Office*